(12) United States Patent
Toufik et al.

(10) Patent No.: US 8,873,681 B2
(45) Date of Patent: Oct. 28, 2014

(54) PROCESS FOR SUPPRESSING INTERCARRIER INTERFERENCE IN A OFDM RECEIVER

(75) Inventors: Issam Toufik, Juan les Pins (FR); Andrea Ancora, Nice (FR)

(73) Assignee: ST-Ericsson SA, Plan-les-Ouates (CH)

( * ) Notice: Subject to any disclaimer, the term of this patent is extended or adjusted under 35 U.S.C. 154(b) by 52 days.

(21) Appl. No.: 13/575,676

(22) PCT Filed: Feb. 15, 2011

(86) PCT No.: PCT/EP2011/000698
§ 371 (c)(1), (2), (4) Date: Oct. 19, 2012

(87) PCT Pub. No.: WO2011/098299
PCT Pub. Date: Aug. 18, 2011

(65) Prior Publication Data
US 2013/0163700 A1    Jun. 27, 2013

(30) Foreign Application Priority Data
Feb. 15, 2010    (EP) ..................... 10368013

(51) Int. Cl.
*H04L 27/06* (2006.01)
*H04L 25/03* (2006.01)
*H04L 27/26* (2006.01)

(52) U.S. Cl.
CPC ...... *H04L 25/03159* (2013.01); *H04L 27/2691* (2013.01); *H04L 2025/03414* (2013.01)
USPC ........... 375/340; 375/260; 375/295; 375/316; 375/322; 375/342

(58) Field of Classification Search
USPC ......... 375/259, 260, 262, 267, 279, 295, 299, 375/316, 322, 326, 340, 341, 345, 350
See application file for complete search history.

(56) References Cited

U.S. PATENT DOCUMENTS 7,672,447 B1 *   3/2010   Lindqvist et al. ......... 379/406.08
8,050,342 B2 *  11/2011   Wang et al. .................... 375/260

(Continued)

OTHER PUBLICATIONS

International Preliminary Report of Patentability and Written Opinion for International application No. PCT/EP2011/000698, issued on Aug. 21, 2012.

(Continued)

*Primary Examiner* — Hirdepal Singh
(74) *Attorney, Agent, or Firm* — Patent Portfolio Builders PLLC

(57) ABSTRACT

Process for canceling Intercarrier Interference in a OFDM receiver receiving OFDM blocks in presence of Doppler, comprising the steps of: receiving a OFDM block comprising N samples; applying a FFT for the purpose of generating N frequency domain representations composing the received signal (R); multiplying said received signal (R) by the hermitian value of the channel ($H^H$), with H being the channel estimate; applying on said received signal a preconditioned conjugate gradient algorithm based on a N×N P preconditioner matrix; Characterized in that said preconditioner matrix is computed at follows: Formula (19) and formula (20), where formula (I) is a $L_{FIR}$×PN selection matrix obtained by extracting a predetermined number ($L_{FIR}$) of rows from the identity matrix $I_{PN}$, LFIR being a predetermined integer inferior to PN, with p corresponding to the basis expansion order chosen and N is the FFT size; formula (II) is equal to $HF^H$, with H being the frequency-domain channel matrix and F being the N×N discrete-Fourier transform unitary matrix F; formula (III) is the N×N identity matrix; formula (IV) is the varience of the noise; formula (V) is being the 1×N vector containing 1 in n-th position and 0 elsewhere.

$S_n$    (I)

$\mathcal{H}$    (II)

$I$    (III)

$\sigma$    (IV)

$1_n$    (V)

$f_n^T = 1_n \mathcal{H}^H \mathcal{H} S_n^T [S_n \mathcal{H}^H (\mathcal{H}\mathcal{H}^H + \sigma_z^2 I)\mathcal{H} S_n^T]^{-1}$    (19)

$\check{G} = \begin{bmatrix} f_0^T S_0 \\ f_1^T S_1 \\ \vdots \\ f_{N-1}^T S_{N-1} \end{bmatrix}$    (20)

10 Claims, 6 Drawing Sheets

(56) References Cited

U.S. PATENT DOCUMENTS

| | | | | |
|---|---|---|---|---|
| 8,254,510 B2* | 8/2012 | Liu et al. | .................. | 375/348 |
| 8,411,773 B2* | 4/2013 | Zhang et al. | .................. | 375/260 |
| 8,432,951 B2* | 4/2013 | Lele et al. | .................. | 375/141 |
| 2007/0211813 A1* | 9/2007 | Talwar et al. | .................. | 375/267 |
| 2008/0014880 A1* | 1/2008 | Hyon et al. | .................. | 455/161.1 |
| 2009/0074050 A1* | 3/2009 | Wang et al. | .................. | 375/232 |
| 2010/0008433 A1 | 1/2010 | Huang et al. | | |
| 2012/0320730 A1* | 12/2012 | Morelli et al. | .................. | 370/210 |

OTHER PUBLICATIONS

International Search Report issued in corresponding International application No. PCT/EP2011/000698, mailing date Apr. 19, 2011.

Written Opinion of the International Searching Authority issued in corresponding International application No. PCT/EP2011/000698, mailing date Apr. 19, 2011.

Lau, Chad C. et al., "Equalization for OFDM with Multiple Delay-Doppler Paths using Conjugate Gradients with Chebyshev Preconditioning", Military Communications Conference, 2007, IEEE, Piscataway, NJ, USA, Oct. 29, 2007, pp. 1-6, XP031232864, ISBN: 978-1-4244-1512-0.

Ancora, Andrea et al., "Preconditioned Iterative Inter-Carrier Interference Cancellation for OFDM Reception in Rapidly Varying Channels", Proceedings of IEEE International Conference on Acoustics, Speech, and Signal Processing (ICASSP), Mar. 14-19, 2010, Dallas, TX, USA, pp. 3066-3069, XP007914691, DOI:10.1109/ICASSP. 2010.5496111, ISBN: 978-1-4244-4296-6.

Rugini, Luca et al., "Channel Estimation and Windowed DEF for OFDM with Doppler Spread", Acoustics, Speech and Signal Processing 2006, ICASSP 2006 Proceedings, 2006 IEEE International Conference on Toulouse, France, May 14-19, 2006, Piscataway, NJ, USA, Jan. 1, 2006, XP031101166, ISBN:978-1-4244-0469-8.

Guan, Raymond et al., "Krylov Subspace Algorithms and Circulant-Embedding Method for Efficient Wideband Single-Carrier Equalization", IEEE Transactions on Signal Processing, IEEE Service Center, New York, NY, USA, vol. PP, No. 6, Jun. 1, 2008, pp. 2483-2495, XP011214914, ISSN: 1053-587X.

Ancora, Andrea et al., "Performance Analysis of Preconditioned Iterative Inter-Carrier Interference Cancellation for OFDM", Communications (ICC), 2010 IEEE International Conference on, IEEE, Piscataway, NJ, USA, May 23, 2010, pp. 1-5, XP031703673, ISBN: 978-1-4244-6402-9.

* cited by examiner

PROCESS FOR SUPPRESSING INTERCARRIER INTERFERENCE IN A OFDM RECEIVER

TECHNICAL FIELD

The invention relates to the field of wireless digital communications and more particularly to a process for suppressing intercarrier interference in an OFDM communication system.

BACKGROUND ART

Digital wireless communications are being widely used throughout the world particularly with the latest development of the Orthogonal Frequency Division Multiplex (OFDM systems) and the latest evolution, namely the so-called Long Term Evolution (LTE), DVB-H, WiFi 802.11 and WiMax 802.16 systems.

OFDM is a frequency-division multiplexing (FDM) scheme utilized as a digital multi-carrier modulation method. As it is well—known to one skilled in the art, OFDM systems demonstrate significant advantages in comparison to single-carrier schemes, particularly in their ability to cope with severe channel conditions (i.e. channel attenuation, narrow-band interference, frequency-selective fading).

However, OFDM systems performances are significantly impaired by the rising of inter-carrier interference (ICI) effect in the presence of time-varying propagation channels. Those circumstances occur in mobile cellular OFDM communication systems as those envisaged in the above mentioned standards.

More specifically, the movement of a User Equipment (UE) in high velocity results to high Doppler spread and accordingly to fast time-varying propagation channels. In turn, the resulting fast time-varying propagation channels yield to significant ICI. In practice, the increased ICI prevents classical OFDM receiver schemes, and particularly the so-called matched filter model—from reliably detecting the desired signal. Hence more advanced receiver equalization techniques are required to mitigate the effect of the ICI.

A known solution for reducing the ICI is based on the performance of a full matrix (N×N) inversion where N represents the OFDM Fast Fourier Transform (FFT) order by Gaussian Elimination. However, the high complexity ($O(N^3)$) of achieving such an inversion cannot be supported by a practical mobile receiver.

To solve the problem of high complexity iterative techniques have been widely used in the art in order to avoid a full matrix inversion. These techniques are based in solving linear systems of equations [1]. Considering a generic linear system of equations of the form $$Ax=b$$

where the vector x is the sequence to be estimated, b is the observation vector, and the matrix A (N×N) is a full-rank input-output transfer matrix, then for any iterative estimation method, the convergence of the sequence estimates $\hat{x}^{(\kappa)} \to x$ is governed by the spectral properties of the matrix A. A commonly used metric for those spectral properties is the condition-number $\kappa(A)$, defined as the ratio between the largest and smallest eigen-values of A, $\kappa(A)=|\lambda_{max}(A)/\lambda_{min}(A)|$ (see reference [1]). Specifically, the closer condition number (CN) is to 1, the faster a given iterative algorithm will converge.

Clearly, the convergence of an algorithm has a significant impact on the performance of the receiver since, firstly, a fast converging algorithm saves the battery life of the receiver (in the case of a mobile receiver) and, secondly, a fast convergence algorithm allows to comply more easily to the requirements given by the standards.

Furthermore, iterative techniques can greatly take advantage from appropriate preconditioning to reduce the CN and to allow faster convergence. Specifically, the iterative methods are applied in an equivalent preconditioned linear system derived from the above mentioned linear system of equations into $$PAx=Pb$$

with P being the preconditioning matrix and such that $\kappa(A) \geq \kappa(PA) \geq 1$ with PA=1 if $P^{-1}=A$.

In prior art there are many preconditioning techniques [1]. Among those, a simple and straightforward technique is the Jacobi preconditioning. Specifically, in Jacobi preconditioning, P is chosen to be diagonal and such that diag$\{P^{-1}\}$=diag$\{A\}$ if $[A]_{ii} \neq 0$ for i=1, . . . , N.

The Jacobi preconditioning consists in approximately solving the problem of inverting matrix A and transform the original problem into a better conditioned one.

Although Jacobi preconditioning significantly reduces the complexity and time required for achieving full matrix A inversion, there is still a need for more advanced preconditioning techniques for achieving the same.

SUMMARY OF THE INVENTION

It is an object of the present invention to provide an efficient process for reducing the complexity and time required for inverting a full matrix in case of ICI mitigation.

It is another object of the present invention to provide an efficient process for decreasing the ICI in the presence of Doppler effect in an OFDM channel.

It is another object of the present invention to provide an efficient process which assists in increasing the lifetime of the battery of a User Equipment (UE) and decreases the manufacturing cost of the latter.

Those and other objects are achieved by means of the ICI cancellation process which comprises the following steps:
  receiving a OFDM block comprising N samples;
  applying a FFT for the purpose of generating N frequency domain representations composing the received signal (R);
  multiplying said received signal (R) by the hermitian value of the channel ($H^H$), with H being the channel estimate;
  applying on said received signal a preconditioned conjugate gradient algorithm based on a N×N P preconditioner matrix;
The process is characterized in that the preconditioning matrix is computed in accordance with the formula below:

$$f_n^T = 1_n \mathcal{H}^H \mathcal{H} S_n^T [S_n \mathcal{H}^H (\mathcal{H}\mathcal{H}^H + \sigma_z^2 I) \mathcal{H} S_n^T]^{-1}$$

And $$P = \check{G} = \begin{bmatrix} f_0^T S_0 \\ f_1^T S_1 \\ \vdots \\ f_{N-1}^T S_{N-1} \end{bmatrix}$$

Where
$S_n$ is a $L_{FIR} \times PN$ selection matrix obtained by extracting a predetermined number ($L_{FIR}$) of rows from the identity matrix $I_{PN}$, LFIR being a predetermined integer inferior to PN, with p corresponding to the basis expansion order chosen and N is the FFT size;

$\mathcal{H}$ is equal to $HF^H$, with H being the frequency-domain channel matrix and F being the N×N discrete-Fourier transform unitary matrix F;

I is the N×N identity matrix;

σ is the varience of the noise;

$1_n$ is being the 1×N vector containing 1 in n-th position and 0 elsewhere

In one embodiment, the conjugate gradient mechanism involves the steps of:

initializing parameters:

$r_0 = \mathcal{H}^H r$ $z_0 = \check{G} r_0$ $d_0 = z_0$ $s_0 = 0_N$

R0, z0, d0, s0 being vectors used for initializing the preconditioned gradient mechanism starting a FOR loop of K iterations with K being inferior to N;

computing:

$$\alpha_k = \frac{r_k^H z_k}{d_k^H (\mathcal{H}^H \mathcal{H} + \sigma_z^2 I) d_k}$$

computing:

$s_{K+1} = s_K + \alpha_K d_K$ computing:

$r_{K+1} = r_K - \alpha_K (\mathcal{H}^H \mathcal{H} + \sigma_z^2 I) d_K$ computing:

$Z_{K+1} = \check{G} r_{K+1}$ computing:

$$\beta_k = \frac{r_{k+1}^H z_{k+1}}{r_k^T z_k}$$

is computing:

$d_{K+1} = z_{K+1} + \beta_K d_K$ then looping back to perform a new FOR loop.

Alternatively, the preconditioning can be used with other algorithm such as a geometric serie and even the Mean Square Error algorithm Preferably, the process is used in a receiver for a Long Term Evolution (LTE) system, and more particularly in a mobile telephone.

The invention also achieves a receiver for an OFDM communication network comprising means for canceling Intercarrier Interference in a OFDM receiver receiving OFDM blocks in presence of Doppler, further comprising:

means for receiving a OFDM block comprising N samples;

means for applying a FFT for the purpose of generating N frequency domain representations composing the received signal (R);

means for multiplying said received signal (R) by the hermitian value of the channel ($H^H$), with H being the channel estimate;

means for applying on said received signal a preconditioned conjugate gradient algorithm based on a N×N P preconditioner matrix.

The receiver is characterized in that said preconditioning matrix is computed at follows:

preconditioning matrix is computed in accordance with the formula below:

$f_n^T = 1_n \mathcal{H}^H \mathcal{H} S_n^T [S_n \mathcal{H}^H (\mathcal{H} \mathcal{H}^H + \sigma_z^2 I) \mathcal{H} S_n^T]^{-1}$ And $$P = \check{G} = \begin{bmatrix} f_0^T S_0 \\ f_1^T S_1 \\ \vdots \\ f_{N-1}^T S_{N-1} \end{bmatrix}$$

At last the invention achieves a mobile telephone for a OFDM communication system, having an improve ICI cancellation mechanism.

DESCRIPTION OF THE DRAWINGS

Other features of one or more embodiments of the invention will best understood by reference to the following detailed description when read in conjunction with the accompanying drawings.

DESCRIPTION OF THE PREFERRED EMBODIMENT

Figure 1:
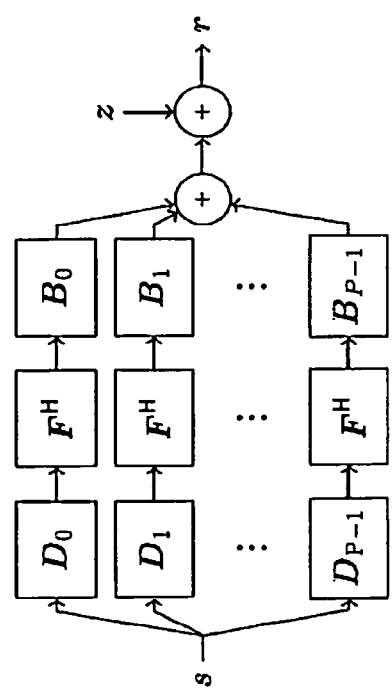
FIG. 1 illustrates a BEM representation of the OFDM received signal

Preliminary to the description of one particular practical embodiment of a preconditioning process, some more theoretical considerations need to be discussed in the following.

I. Theoretical Considerations

1. Signal and System Modeling

One considers the transmission over a time-varying, frequency-selective fading channel with continuous-time impulse response $h(t,\tau) = \Sigma_m \alpha_m(t) \psi(\tau - \tau_m)$ assumed to obey the wide sense stationary uncorrelated scattering (WSSUS) model [2], where $\psi(\tau)$ represents the equivalent transmit-receiver front-end low-pass filter, $\tau_m$ represents the p-th path delay, $\alpha_m(t)$ is the time-varying complex channel coefficient associated with the m-th path of the propagation channel respectively. One shall refer to h[κ,l]| as the corresponding low-pass sampled discrete-time impulse response, and assume h[κ,l] to be well-approximated by a finite-impulse response model with a maximum delay spread of L samples. Then one assumes a classical OFDM system with cyclic-prefix of duration $N_{cp} \geq L$ to avoid inter-symbol-interference. By letting N denote the number of sub-carriers the OFDM symbol duration is given by Nblock=$N+N_{cp}$. The frequency-domain k-th OFDM transmit symbol $s[\kappa]=[s[\kappa N] \ldots s[\kappa N-N+1]]^T$, where $(.)^T$ denotes transpose, comprising the encoded symbols s[i] at the output of channel encoding, interleaving and mapping onto a finite-symbol constellation S assumed i.i.d. with unit energy, is modulated by an N×N discrete-Fourier transform unitary matrix F so as to obtain $$\cap[\kappa]=F^H s[\kappa] \quad (1)$$

where $(.)^H$ denotes Hermitian transpose. Without accounting for the cyclic-prefix, the n-th received symbol can be written as $$r[\kappa]=H[\kappa]\cap[\kappa]+z[\kappa] \quad (2)$$

where $r[\kappa]=[r[\kappa N] \ldots r[\kappa N-N+1]]^T$, $H[\kappa]$ represents the N×N time domain channel convolution matrix, and $z[\kappa]=[z[\kappa N] \ldots z[\kappa N-N+1]]^T$ represents a circularly symmetric complex additive white Gaussian noise such that $z[\kappa] \sim \mathcal{N}c(0, \sigma_z^2 I)$ For the sake of the notational simplicity and without loss of generality, one shall drop the time index k in the sequel. Thus equation (2) can be rewritten as follows $$r=HF^H s+z \quad (3)$$

Since in general $L \ll N$ the channel matrix H will tend to be sparse and banded. When the channel is time invariant within an OFDM symbol, H is circulant and therefore the frequency-domain channel matrix, $FHF^H$, is diagonal.

This characteristic is widely exploited to perform one-tap frequency-domain equalization.

In case of time-varying channel though, H is no longer circulant and results in a full frequency-domain channel matrix. Thus the classical OFDM equalization approach is highly suboptimal and more complex equalization is required (see [3], [4] and references therein).

2. Channel BEM Representation

The channel convolution matrix can be reformulated as $$H = \sum_{l=0}^{L-1} Q_l \text{diag}\{h_l\} \quad (4)$$

Where $h_l=h[\kappa, l]=[h[\kappa N, l] \ldots h[\kappa N-N+1, l]]^T$ comprises the l-th channel tap time-varying values and $Q_l$ denotes the corresponding N×N circulant delay matrix with ones in the l-th lower diagonal and zeros elsewhere, i.e. with elements $[Q_l]_{ij}=1$ if $j=(i-1)_{mod\,N}$ and zero otherwise. The vector corresponding to the time-varying evolution of the l-th channel tap can be expressed according to the BEM as follows $$h_l = Bv_l = \sum_{p=0}^{P-1} v_{l,p} b_p \quad (5)$$

where the N×P matrix $B=[b_0 b_1 \ldots b_{P-1}]$ denotes the deterministic basis spanned by the P complex vectors $b_p$ for p=0, ..., P-1, and $v_l=[v_{l,0} \ldots v_{l,P-1}]^T$ the stochastic coefficients describing the l-th channel tap behavior for the given OFDM block on the P basis functions.

Then, by plugging (4) in (5)

$$H = \sum_{l=0}^{L-1} \left( \sum_{p=0}^{P-1} v_{l,p} \text{diag}\{b_p\} \right) Q_l \quad (6)$$

$$= \sum_{p=0}^{P-1} \text{diag}\{b_p\} \sum_{l=0}^{L-1} v_{l,p} Q_l$$

By defining $B_p = \text{diag}\{b_p\}$ and summing over the L channel taps, it results $$H = \sum_{p=0}^{P-1} B_p F^H D_p F \quad (7)$$

Then the received signal r of (3) can be expressed according to the channel BEM as $$r = \sum_{p=0}^{P-1} B_p F^H D_p s + z \quad (8)$$

$\Sigma_{l=0}^{L-1} v_{l,p} Q_l$ being a circulant matrix, then $$D_p = F \sum_{l=0}^{L-1} v_{l,p} Q_l F^H$$

is a diagonal matrix.

FIG. 1 depicts the model of the OFDM received signal in the channel BEM representation.

II. Linear Equalization

In the following it will be recalled the (Linear) Minimum-Mean-Square-Error (L-MMSE), Zero Forcing (ZF), and Matched Filter (MF) equalization.

Letting $\mathcal{H} = HF^H$, we have for the estimated OFDM transmitted sequence $$\hat{s}_{MMSE} = (\mathcal{H}^H \mathcal{H} + \sigma_z^2 I)^{-1} \mathcal{H}^H r \quad (9)$$

with the MMSE Minimum Mean Square Error equalizer. In the assumption of perfect knowledge of the channel and of its second order statistics, the MMSE estimate (9) entails the inversion of a full matrix in general requiring $O(N^3)$ complexity order when classical techniques are used, e.g. the Gauss-Jordan elimination method [5]. An iterative technique can be adopted instead to avoid a full matrix inversion thus reducing the receiver equalization complexity as detailed below.

III. Iterative ICI Cancellation

As mentioned in the prior art section, a wide number of iterative techniques is known from the literature in order to solve linear systems of equation, see e.g. [1]. For a given technique the overall complexity depends on the number of operations per iteration stage times the number of iterations necessary to achieve the estimation accuracy required for the target sequence detection performance. In view of these considerations the speed of convergence is a primary aspect driving the design of an iterative equalization algorithm.

Considering the generic linear system of equations of the form $$Ax = b \qquad (10)$$

described in the Background Art section, we can express the equalization problem (9) as follows:

$$(\mathcal{H}^H\mathcal{H} + \sigma_z^2 I)\hat{s}_{MMSE} = \mathcal{H}^H r \qquad (11)$$

In light of the above, the convergence of an iterative approach to the solution of the problem depend on the high will $\kappa(\mathcal{H}^H\mathcal{H}) = \kappa(\mathcal{H})^2$ in the high SNR($\sigma_z^2 \to 0$)$_{regimes}$.

As indicated in the Background Art section, preconditioning can be applied to iterative techniques in order to reduce the CN and to allow faster convergence in order to, firstly, increases the life of the battery of the mobile receiver and, secondly to comply with the time requirement for processing the signal. The iterative methods are applied in an equivalent preconditioned linear system derived from (10) into $$PAx = Pb \qquad (12).$$

A. BEM-MMSE Preconditioned Iterative ICI Cancellation

Preconditioning has proven to be useful (see [6] for instance) for improving the ZF iterative ICI cancellation problem.

As known by the skilled man, preconditioning Zero Forcing (ZF) is a technique used instead of MMSE but which provides inferior performance.

The prior art solution which was mentioned in the above prior art section, is based on a diagonally pre-conditioned ZF iterative algorithm, uses a pre-conditioner made of a diagonal matrix whose elements are exactly the diagonal matrix of the inverse of the frequency-domain channel matrix diag$\{P\}$=diag$\{(FHF^H)^{-1}\}$.

There will now be described an improved ICI cancellation process which achieves a new and more effective preconditioning and thus approximates more the global MMSE optimal solution.

Indeed, the inventors have discovered that the channel BEM can be exploited at the receiver side and interpreted as a multiple windowing of the received signal where the windowing functions correspond to the conjugate of the basis $B_p$. Let the output of each windowing-branch vector be defined as the projection of the received signal onto the p-th basis function $$y_p = FB_p^H r \qquad (13)$$

then the expanded observation vector of the received signal is obtained by stacking each windowing-branch vector in a $PN \times 1$ vector as $$y = \begin{bmatrix} y_0 \\ y_1 \\ \vdots \\ y_{P-1} \end{bmatrix} = \begin{bmatrix} FB_0^H \\ FB_1^H \\ \vdots \\ FB_{P-1}^H \end{bmatrix} r = Ur \qquad (14)$$

Given the BEM representation of equation (7), we estimate the symbol s[n] at subcarrier n by adopting local MMSE Finite-Impulse-Response (FIR) filter $f_n$ across tones for all the basis output. Exploiting the particular structure of ICI in the channel BEM representation, one can limit the complexity of a full per-tone equalization across all sub-carriers, by selecting a subset of the elements of vector y as $\bar{y}_n = S_n y$ with $S_n$ being a $L_{FIR} \times PN$ selection matrix obtained by extracting $L_{FIR}$ rows (LFIR being a predetermined integer inferior to PN, as small as possible in order to achieve a minimum complexity with an acceptable performance) of the identity matrix $I_{PN}$ exploiting the structure of U for a given $L_{FIR}$ and sub-carrier n to have $$\hat{s}[n] = f_n^T \bar{y}_n \qquad (15)$$

Therefore, the per-tone MMSE filter coefficients are computed such that $$f_n^T = E\{s(n)\bar{y}_n^H\} R_{\bar{y}_n\bar{y}_n}^{-1} \qquad (16)$$

where $R_{\bar{y}_n\bar{y}_n} = E\{\bar{y}_n\bar{y}_n^H\}$.

It is noteworthy mentioning that the above expression stems from the multiplication of a $1 \times L_{FIR}$ vector $E\{s(n)\bar{y}_n^H\}$ and $L_{FIR} \times L_{FIR}$ inverse matrix of $R^{\bar{y}}_{\bar{y}_n}$ which varies across sub-carriers.

Moreover, the computation of the MMSE filtering coefficients can exploit the coherence across sub-carriers and be made by applying a recursive method. A sufficiently precise approximation of the inverse of the matrix $R_{\bar{y}_n\bar{y}_n}$, i.e. $\|I_{L_{FIR}} - \hat{R}_{\bar{y}_n\bar{y}_n}^{-1} R_{\bar{y}_n\bar{y}_n}\| \leq \epsilon$ (with $\epsilon$ representative of the level of accuracy being desired) can be computed using the approximation of the inverse on sub-carrier n−1 as initialization and applying the following iterative formula:

$$\begin{cases} \hat{R}_{\bar{y}_n\bar{y}_n}^{-1(0)} = \hat{R}_{\bar{y}_{n-1}\bar{y}_{n-1}}^{-1} \\ \hat{R}_{\bar{y}_n\bar{y}_n}^{-1(i)} = 2\hat{R}_{\bar{y}_n\bar{y}_n}^{-1(i-1)} - \hat{R}_{\bar{y}_n\bar{y}_n}^{-1(i-1)} R_{\bar{y}_n\bar{y}_n} \hat{R}_{\bar{y}_n\bar{y}_n}^{-1(i-1)} \end{cases} \qquad (17)$$

to be used in (34) to compute the filtering coefficients.

All the filters coefficients can be stacked in a sparse filter matrix $$G = \begin{bmatrix} f_0^T S_0 \\ f_1^T S_1 \\ \vdots \\ f_{N-1}^T S_{N-1} \end{bmatrix} \qquad (18)$$

The matrix resulting from the product of GU can therefore be seen as an improved BEM-MMSE pre-conditioner.

Moreover, the complexity associated to the filtering operation is proportional to $P(N+N \log_2 N)$.

Figure 4:
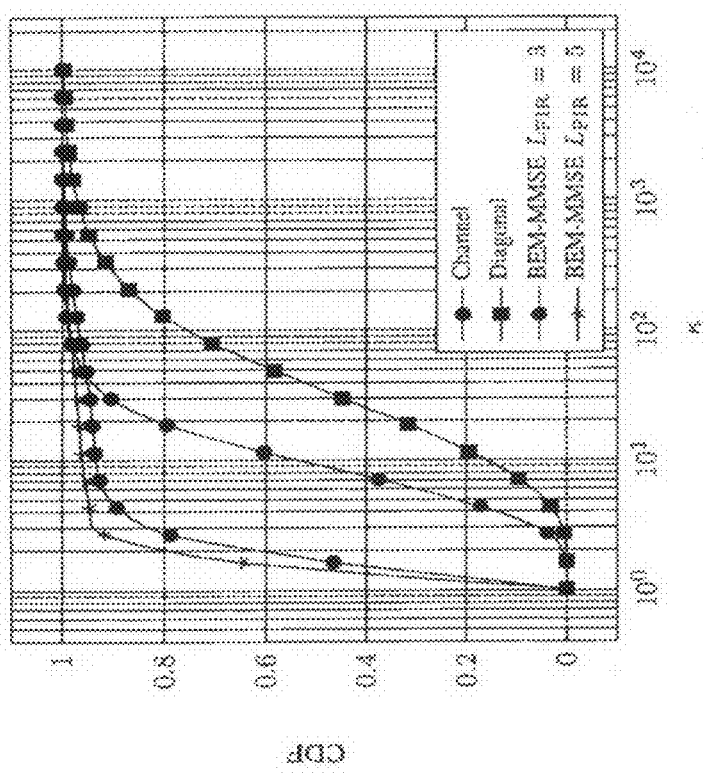
FIG. 4 illustrates the condition number (CN) for diagonal and BEM-MMSE preconditioning
Figure 5A:
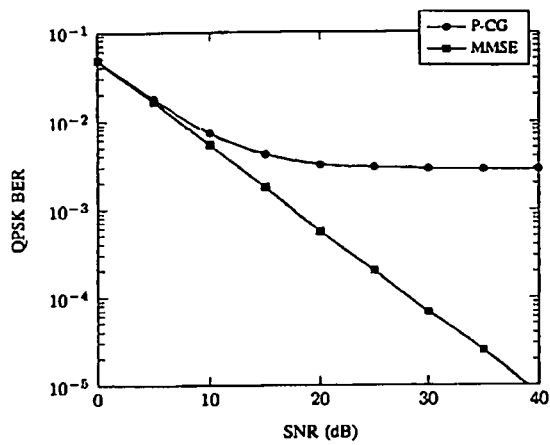
FIG. 5a is a diagram illustrating the comparison of the performance of the receiver with 1 iterations and $L_{FIR}=5$.
Figure 5B:
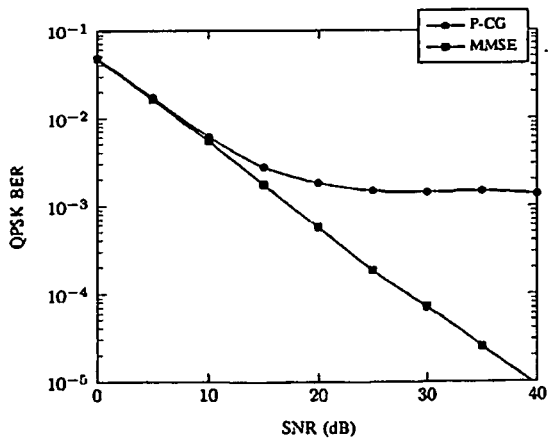
FIG. 5b is a diagram illustrating the comparison of the performance of the receiver with 3 iterations and $L_{FIR}=5$.
Figure 5C:
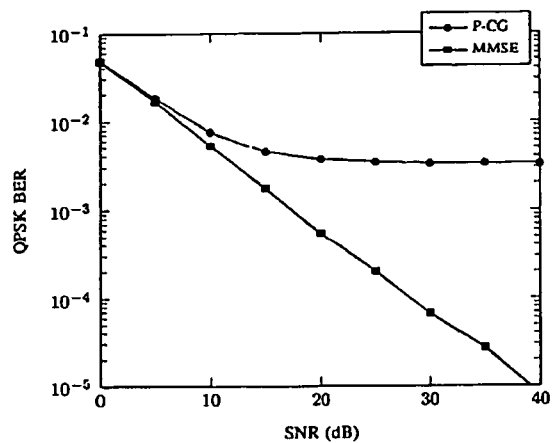
FIG. 5c is a diagram illustrating the comparison of the performance of the receiver with 1 iterations and $L_{FIR}=3$.
Figure 5D:
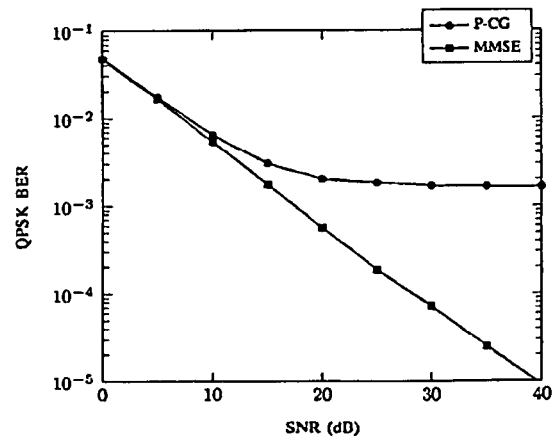
FIG. 5d is a diagram illustrating the comparison of the performance of the receiver with 3 iterations and $L_{FIR}=3$.

Indeed, this approach achieves considerably better preconditioning than the one previously presented relying on diagonal preconditioning. Its effectiveness is shown in FIG. 4 where the Cumulative-Distribution-Function (CDF) of the CN for BEM-MMSE preconditioning is compared to both the diagonal preconditioning explained above and to the channel without preconditioning.

This novel approach can be used for achieving a stationary polynomial iterative receiver whose performance are considerably improved, but yet of affordable complexity as the original method.

B. Preconditioned Conjugate Gradient MMSE Receiver

It is worth deriving iterative ICI cancellation techniques operating in the squared channel matrix domain and solving the steady state MMSE problem as given in expression (11).

Noticing that the left hand-side of the linear system of MMSE detection in (11) is Hermitian, the Conjugate Gradient (CG) algorithm can be applied.

Figure 3:
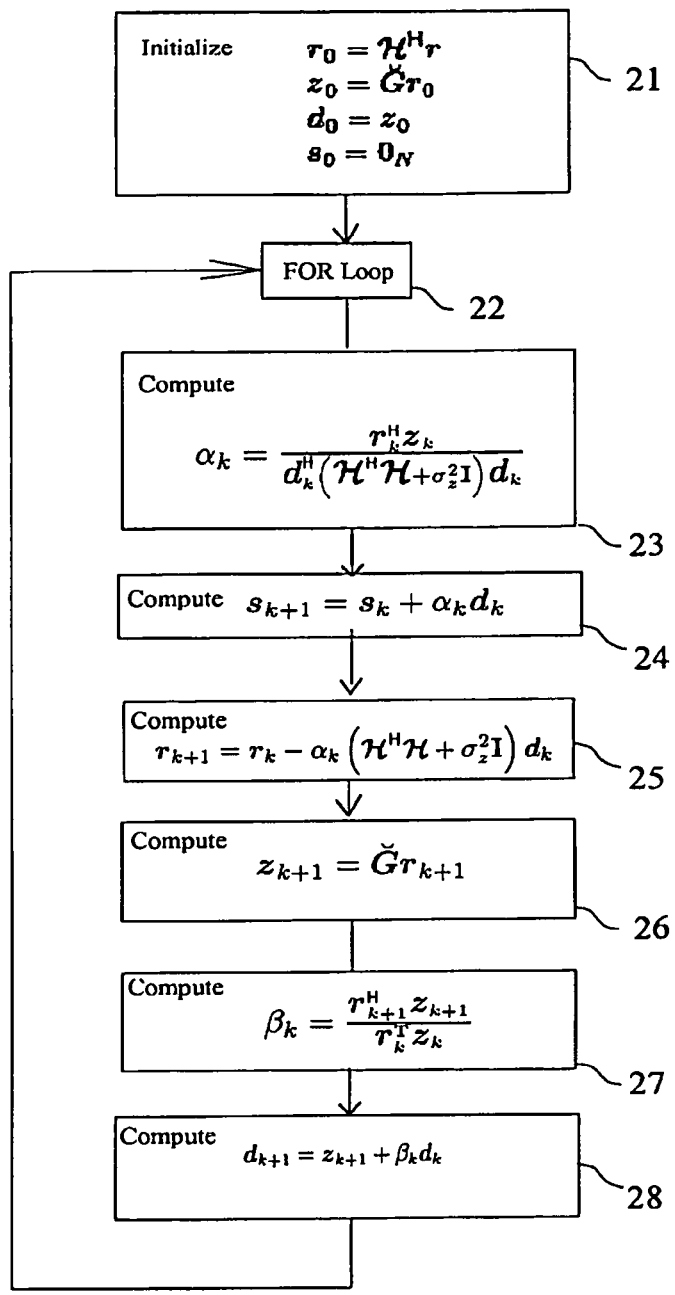
FIG. 3 illustrates one embodiment of the conjugate gradient process.

A banded preconditioning computed with similar development as for BEM-MMSE can be derived for a Preconditioned CG iterative receiver [1], whose algorithm is presented in FIG. 3. Letting $$f_n{}^T = 1_n \mathcal{H}^H \mathcal{H} S_n{}^T [S_n \mathcal{H}^H (\mathcal{H}\mathcal{H}^H + \sigma_z{}^2 I) \mathcal{H} S_n{}^T]^{-1} \quad (19)$$

$$\check{G} = \begin{bmatrix} f_0^T S_0 \\ f_1^T S_1 \\ \vdots \\ f_{N-1}^T S_{N-1} \end{bmatrix} \quad (20)$$

for an given choice of the selection matrix Sn and filter length $L_{FIR}$.

In one embodiment, the appropriate selection Sn is based on the selection of the n subcarrier and two subcarriers, respectively above and below the considered subcarrier. Alternatively, four subcarriers may be selected. Clearly, the more subcarriers—and thus selections—the more effective will be the ICI cancellation, but at the cost of higher level of DSP resources.

Figure 2:
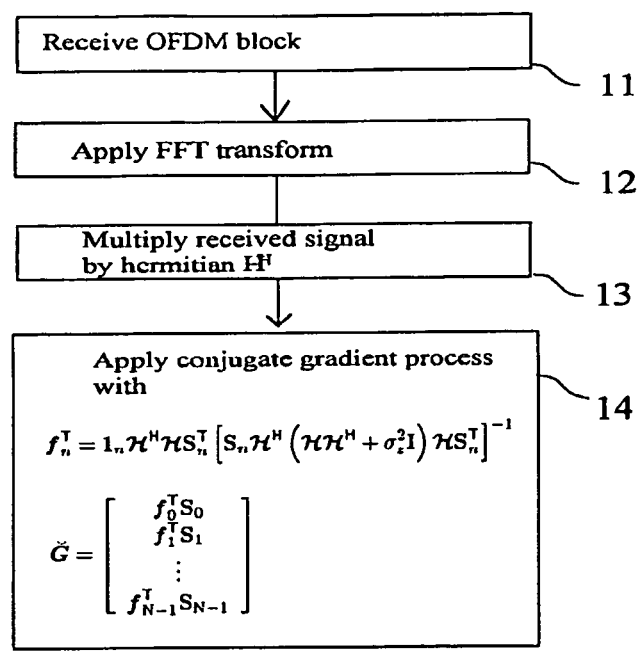
FIG. 2 illustrates one embodiment of the process of the invention.

C. Best embodiment for a process achieving a Preconditioned Conjugate Gradient MMSE Receiver With respect to FIG. 2, there will now be described a preferred embodiment of a process for processing a OFDM receive signal to perform OFDM reception in presence of Doppler which achieves an enhanced precondition conjugate gradient MMSE receiver.

In a step 11, the process proceeds with the reception of a OFDM block comprising N samples.

The signal received from the antenna is $HF^H s$ with s being the transmitted frequency domain sequence, $F^H$ being the inverse Fourier Transform applied in the transmitter and H being the propagation channel.

In a step 12, the process proceeds with the application of a FFT for the purpose of generating N frequency domain representations composing the received signal (R).

Then, in a step 13, the process proceeds with the multiplication of said received signal (R) by the hermitian value of the channel ($H^H$), with H being the channel estimate.

Then, in a step 14, the process proceeds with the application on said received signal of a preconditioned conjugate gradient algorithm based on a N×N P preconditioner matrix, the preconditionner matrix being computed at follows:

$$f_n{}^T = 1_n \mathcal{H}^H \mathcal{H} S_n{}^T [S_n \mathcal{H}^H (\mathcal{H}\mathcal{H}^H + \sigma_z{}^2 I) \mathcal{H} S_n{}^T]^{-1} \quad (19)$$

and $$\check{G} = \begin{bmatrix} f_0^T S_0 \\ f_1^T S_1 \\ \vdots \\ f_{N-1}^T S_{N-1} \end{bmatrix} \quad (20)$$

Where $S_n$ is a $L_{FIR} \times P \times N$ selection matrix obtained by extracting a predetermined number ($L_{FIR}$) of rows (note $L_{FIR}$ corresponding to the estimated length of the channel) from the identity matrix $I_{PN}$;

$\mathcal{H}$ is equal to $H F^H$,

I is the N×N identity matrix;

$\sigma_z$ is the varience of the noise z in equation (3);

$1_n$ is being the 1×N vector containing 1 in n-th position and 0 elsewhere

It should be noticed that, while matrix $\check{G}$. is a N×N matrix, the latter is particularly sparce because of the use of the selection matrix $S_n$. This strongly reduces the complexity of the algorithm and thus limits the need of the digital signal processing in the receiver.

It should be noticed that, while the preconditioning which was defined above works particularly well with the so-called conjugate gradient algorithm, it can also be used with other algorithms, such as the geometric serie and even the Mean Square Error algorithm.

With respect to FIG. 3, there will now be described a more particular embodiment of the process executed for the purpose of achieving the preconditioned conjugate gradient.

In a step 21, the process proceeds with the initialization of parameters $r_0 = \mathcal{H}^H r$
$z_0 = \check{G} r_0$
$d_0 = z_0$
$s_0 = 0_N$ Where $r_0$, $z_0$, $d_0$ and $s_0$ are intermediate computing parameters used in the conjugate gradient method corresponding to k=0.

Step 22 is the entry point of a FOR loop for a set of K iterations (For k=0 to K−1) of variable k.

In a step 23, the process proceeds with the computation of:

$$\alpha_k = \frac{r_k^H z_k}{d_k^H (\mathcal{H}^H \mathcal{H} + \sigma_z^2 I) d_k}$$

It should be noticed $r_k^H Z_k$ corresponds to a inner product of the components of the two vectors $r_k$ and $Z_k$ In a step 24, the process proceeds with the computation of:

$$s_{\kappa+1} = s_\kappa + \alpha_\kappa d_\kappa$$

Then, in a step 25, the process computes:

$$r_{\kappa+1} = r_\kappa - \alpha_\kappa (\mathcal{H}^H \mathcal{H} + \sigma_z^2 I) d_\kappa$$

Then, in a step 26, the process computes:

$$z_{\kappa+1} = \check{G} r_{\kappa+1}$$

Then, in a step 27, the process computes:

$$\beta_k = \frac{r_{k+1}^H z_{k+1}}{r_k^T z_k}$$

Then, in a step 28, the process computes:

$$d_{\kappa+1} = z_{\kappa+1} + \beta_\kappa d_\kappa$$

The process then completes the current FOR loop and loops back to step 22 again in order to process a new loop.

D. Simulation Results

FIG. 4 illustrates the condition number (CN) for diagonal and BEM-MMSE preconditioning One may compare the methods proposed in this paper by means of Monte Carlo simulations assuming a cyclic prefixed OFDM setup with N=128 sub-carriers, a multi-path channel with L=4 with uniform power delay profile and Jake's Doppler spectrum [2] with normalized Doppler frequency of 0.1 with respect to the sub-carriers spacing. We assume a first order orthogonal-polynomial BEM channel with P=2.

The performances are measured in terms of bit-error-rate of uncoded QPSK modulated transmitted sequences. The SNR is defined as the ratio $1/\sigma_z^2$. The methods presented in the paper are evaluated for BEM-MMSE preconditioning filtering lengths of $L_{FIR}=3$ and $L_{FIR}=5$. A number of iterations K=1 and K=3 are tried to allow fair comparison with the method of [6]. For all simulation results presented in FIGS. 5a-5d, the Non Stationary BEM-MMSE Preconditioned iterative ICI cancellation technique (NS-P-BEM) provides always the overall best performances compared to the reference full-blown matrix inversion MMSE method (labeled MMSE in the plots). The Preconditioned CG method (P-CG), instead, always provides the worst performance for the same number of iteration and MMSE filter lengths. The Preconditioned ZF Iterative (P-ZF) of [6] is drastically improved by the use of Stationary BEM-MMSE preconditioning (S-P-BEM) and the PIC iterative receiver provides a good trade-off in terms of performance and complexity.

REFERENCES

[1] R. Barrett, Templates for the solution of linear systems: building blocks for iterative methods, Society for Industrial Mathematics, 1994.

[2] J. G. Proakis and M. Salehi, Digital communications, McGraw-Hill Boston, 1995.

[3] L. Rugini, P. Banelli, R C Cannizzaro, and G. Leus, "Channel Estimation and Windowed DEF for OFDM with Doppler Spread," in 2006 IEEE International Conference on Acoustics, Speech and Signal Processing, 2006. ICASSP 2006 Proceedings, 2006, vol. 4.

[4] P. Schniter and H. Liu, "Iterative frequency-domain equalization for single-carrier systems in doubly-dispersive channels," in Signals, Systems and Computers, 2004. Conference Record of the Thirty-Eighth Asilomar Conference on, 2004, vol. 1.

[5] G. H. Golub and C. F. Van Loan, Matrix computations, Johns Hopkins University Press, 1996.

[6] C. Y. Hsu and W. R. Wu, "A low-complexity ICI mitigation method for high-speed mobile OFDM systems," in 2006 IEEE International Symposium on Circuits and Systems, 2006. ISCAS 2006. Proceedings, 2006, p. 4.

The invention claimed is:

1. A process for canceling Intercarrier Interference in a OFDM receiver comprising digital signal processing circuits, said OFDM receiver receiving OFDM blocks in presence of Doppler, said process comprising the steps of:

receiving a OFDM block, said OFDM block comprising N samples;

applying, by said digital signal processing circuits, a Fast Fourier Transform (FFT) on said OFDM block for the purpose of generating N frequency domain representations composing the received signal;

multiplying said received signal by the hermitian value of the channel by said digital signal processing circuits, with H being the channel estimate; and applying on said received signal a preconditioned conjugate gradient algorithm based on a N×N P preconditioner matrix by said digital signal processing circuits;

wherein said preconditioning matrix is computed as follows:

$$f_n^T = 1_n \mathcal{H}^H \mathcal{H} S_n^T [S_n \mathcal{H}^H (\mathcal{H} \mathcal{H}^H + \sigma_z^2 I) \mathcal{H} S_n^T]^{-1}$$

And $$P = \check{G} = \begin{bmatrix} f_0^T S_0 \\ f_1^T S_1 \\ \vdots \\ f_{N-1}^T S_{N-1} \end{bmatrix}$$

Where $S_n$ is a $L_{FIR} \times PN$ selection matrix obtained by extracting a predetermined number ($L_{FIR}$) of rows from the identity matrix $I_{PN}$; LFIR being a predetermined integer inferior to PN, with p corresponding to the basis expansion order chosen and N is the FFT size;

$\mathcal{H}$ is equal to $HF^H$, with H being the frequency-domain channel matrix and F being the N×N discrete-Fourier transform unitary matrix F;

I is the N×N identity matrix;

σ is the varience of the noise; and $1_n$ is being the 1×N vector containing 1 in n-th position and 0 elsewhere.

2. The process according to claim 1 wherein said conjugate gradient mechanism involves the steps of:

initializing parameters:

$r_0 = \mathcal{H}^H r$
$z_0 = \check{G} r_0$
$d_0 = z_0$
$s_0 = 0_N$

R0, z0, d0, s0 being vectors used for initializing the preconditioned gradient mechanism;

starting a FOR loop of K iterations, with K being inferior to N;

computing:

$$\alpha_k = \frac{r_k^H z_k}{d_k^H (\mathcal{H}^H \mathcal{H} + \sigma_z^2 I) d_k}$$

computing:

$s_{K+1} = s_K + \alpha_K d_K$ computing:

$r_{K+1} = r_K - \alpha_K (\mathcal{H}^H \mathcal{H} + \sigma_z^2 I) d_K$ computing:

$z_{K+1} = \check{G} r_{K+1}$ computing:

$$\beta_k = \frac{r_{k+1}^H z_{k+1}}{r_k^T z_k}$$

computing:

$d_{K+1} = z_{K+1} + \beta_K d_K$ then looping back to perform a new FOR loop.

3. The process according to claim 1 wherein the preconditioning is used in a combination with a geometric series and the Mean Square Error algorithm.

4. The process according to claim 1 wherein the process is executed in a Long Term Evolution (LTE) system or WIMAX system.

5. The process according to claim 1 wherein the process is used in a mobile telephone.

6. A mobile telephone for a OFDM communication system comprising digital processing circuits for performing the process defined in claim 1.

7. A receiver for an OFDM communication network comprising digital processing circuits for canceling Intercarrier Interference in a OFDM receiver receiving OFDM blocks in presence of Doppler, wherein said digital processing circuits perform the following steps:
- receiving a OFDM block comprising N samples;
- applying a FFT for the purpose of generating N frequency domain representations composing the received signal;
- multiplying said received signal by the hermitian value of the channel ($H^H$), with H being the channel estimate; and
- applying on said received signal a preconditioned conjugate gradient algorithm based on a N×N P preconditioner matrix;
- wherein said preconditioning matrix is computed as follows:

$$f_n^T = 1_n \mathcal{H}^H \mathcal{H} S_n^T [S_n \mathcal{H}^H (\mathcal{H} \mathcal{H}^H + \sigma_z^2 I) \mathcal{H} S_n^T]^{-1}$$

And $$P = \check{G} = \begin{bmatrix} f_0^T S_0 \\ f_1^T S_1 \\ \vdots \\ f_{N-1}^T S_{N-1} \end{bmatrix}$$

Where $S_n$ is a $L_{FIR} \times PN$ selection matrix obtained by extracting a predetermined number ($L_{FIR}$) of rows from the identity matrix $I_{PN}$; LFIR being a predetermined integer inferior to PN, with p corresponding to the basis expansion order chosen and N is the FFT size;

$\mathcal{H}$ is equal to $HF^H$, with H being the frequency-domain channel matrix and F being the N×N discrete-Fourier transform unitary matrix F;

I is the N×N identity matrix;

σ is the varience of the noise; and 1n is being the 1×N vector containing 1 in n-th position and 0 elsewhere.

8. The process according to claim 7 wherein said digital processing circuits perform the following steps:

initializing parameters:
$r_0 = \mathcal{H}^H r$
$z_0 = \check{G} r_0$
$d_0 = z_0$
$s_0 = 0_N$ starting a FOR loop;
computing:

$$\alpha_k = \frac{r_k^H z_k}{d_k^H (\mathcal{H}^H \mathcal{H} + \sigma_z^2 I) d_k}$$

computing:

$$s_{\kappa+1} = s_\kappa + \alpha_\kappa d_\kappa$$

computing:

$$r_{\kappa+1} = r_\kappa - \alpha_\kappa (\mathcal{H}^H \mathcal{H} + \sigma_z^2 I) d_\kappa$$

computing:

$$z_{\kappa+1} = \check{G} r_{\kappa+1}$$

computing:

$$\beta_k = \frac{r_{k+1}^H z_{k+1}}{r_k^T z_k}$$

computing:

$$d_{\kappa+1} = z_{\kappa+1} + \beta_\kappa d_\kappa$$

then looping back to perform a new FOR loop.

9. The receiver according to claim 7 wherein the receiver is used in a LTE network.

10. The receiver according to claim 7 wherein the receiver is used in a mobile telephone.

\* \* \* \* \*